(12) United States Patent
Nagoshi et al.

(10) Patent No.: US 6,991,871 B2
(45) Date of Patent: Jan. 31, 2006

(54) FUEL CELL

(75) Inventors: Kentaro Nagoshi, Utsunomiya (JP);
Keisuke Andou, Saitama (JP); Hideaki Kikuchi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/650,610

(22) Filed: Aug. 27, 2003

(65) Prior Publication Data

US 2004/0043285 A1    Mar. 4, 2004

(30) Foreign Application Priority Data

Aug. 27, 2002  (JP)  ............................. 2002-247376
Aug. 27, 2002  (JP)  ............................. 2002-247398

(51) Int. Cl.
*H01M 4/86*    (2006.01)
*H01M 2/00*    (2006.01)

(52) U.S. Cl. .......................................... 429/44; 429/34
(58) Field of Classification Search .................. 429/12, 429/34, 35, 36, 247, 42
See application file for complete search history.

(56) References Cited

U.S. PATENT DOCUMENTS

| 5,108,849 | A | * | 4/1992 | Watkins et al. ................ 429/30 |
| 6,099,984 | A | * | 8/2000 | Rock ............................ 429/39 |
| 6,566,004 | B1 |  | 5/2003 | Fly et al. |
| 2002/0068214 | A1 | * | 6/2002 | Reiser .......................... 429/41 |
| 2002/0114990 | A1 | * | 8/2002 | Fly et al. ....................... 429/44 |
| 2004/0137303 | A1 | * | 7/2004 | Kuroki et al. ................. 429/35 |

FOREIGN PATENT DOCUMENTS

| EP | 0 692 546 | 1/1996 |
| JP | 62-097269 | 5/1987 |
| JP | 4-18964 | 2/1992 |
| JP | 06-005289 | 1/1994 |
| JP | 62-75305 | 9/1994 |
| JP | 8-53723 | 2/1996 |
| JP | 2001-202984 | 7/2001 |
| JP | 2002-151107 | 5/2002 |
| WO | WO2002089240 | * 11/2002 |

OTHER PUBLICATIONS

The American Heritage Dictionary of the English Language. 1992. Houghton Mifflin Company. Third Edition. impregnate.*

* cited by examiner

*Primary Examiner*—Patrick Joseph Ryan
*Assistant Examiner*—Melissa Austin
(74) *Attorney, Agent, or Firm*—Lahive & Cockfield, LLP; Anthony A. Laurentano, Esq.

(57) ABSTRACT

A fuel cell includes a membrane electrode assembly and first and second separators in the form of meal plates for sandwiching the membrane electrode assembly. An anode of the membrane electrode assembly has a gas diffusion layer, and a cathode of the membrane electrode assembly has a gas diffusion layer. Each of the gas diffusion layers includes a foamed member made of metal material such as stainless steel. Resinous flow field walls are provided in the foamed member by impregnation for forming a reactant gas flow field.

8 Claims, 17 Drawing Sheets

FUEL CELL

BACKGROUND OF THE INVENTION

1. Field of the Invention

The present invention relates to a fuel cell including a membrane electrode assembly interposed between separators. The membrane electrode assembly includes a pair of electrodes, and an electrolyte membrane interposed between the electrodes.

2. Description of the Related Art

Generally, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane. The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

Typically, each of the anode and the cathode has a gas diffusion layer such as a porous carbon paper, and an electrode catalyst layer of platinum alloy supported on porous carbon particles. The carbon particles are deposited uniformly on the surface of the gas diffusion layer. The electrode catalyst layer of the anode and the electrode catalyst layer of the cathode are fixed to both surfaces of the electrolyte membrane, respectively. Japanese patent No. 3,211,378 discloses a polymer electrolyte fuel cell in an attempt to improve the gas diffusion properties of the reactant gases from the gas diffusion layer to the electrode catalyst layer.

In the prior art, a polymer electrolyte membrane is interposed between porous carbon bodies each supporting a catalyst layer. Foamed metals are provided outside the porous carbon bodies, and bulk electrodes are provided outside the foamed metals. Water repellent treatment is applied to at least a part of the foamed metals.

According to the disclosure, diffusion properties of the reactant gases through the foamed metals to the catalyst layers supported by the porous carbon bodies are improved.

Generally, as shown in FIG. 17, the fuel cell of this type has a membrane electrode assembly 1 interposed between a pair of separators 2a, 2b. The membrane electrode assembly 1 includes an anode 4, a cathode 5, and a polymer electrolyte membrane 3 interposed between the anode 4 and the cathode 5. The separator 2a has a reactant gas flow field 6 for supplying a fuel gas to the anode 4. The separator 2b has an oxygen-containing gas flow field 7 for supplying an oxygen-containing gas to the cathode 5.

In the structure, however, the costs of providing the oxygen-containing gas flow field 6 and the fuel gas flow field 7 such as the cost of forming grooves of the separators 2a, 2b, the cost of producing the separators 2a, 2b of metal plates by press forming, and the cost of forming grooves in the diffusion layers of the cathode 4 and the anode 5 are high. Therefore, the overall production cost for the fuel cell is high. Further, the fuel cell has a large dimension in a stacking direction indicated by an arrow X. In particular, the dimension of the fuel cell stack formed by stacking fuel cells in the stacking direction indicated by the arrow X is considerably large.

Typically, reactant gas passages extend through the fuel cell stack as internal manifolds for supplying and discharging reactant gases such as the oxygen-containing gas and the fuel gas. The fuel cell stack requires a sealing structure for reliably preventing the leakage of the reactant gases from the reactant gas passages. The sealing structure tends to be complex, and expensive.

In the prior art, the foamed metal is used as the diffusion layer. The foamed metal has a very low elasticity. Therefore, if the membrane electrode assembly is swelled by absorbing water, or thermally expanded, or if the pressure of impacts or shocks is applied to the surface of the foamed metal, the foamed metal may be plastically deformed undesirably.

If the area in the foamed metal is used as a part of the reactant gas flow field, the porosity of the foamed metal needs to be high for maintaining the pressure loss in the foamed metal. However, if the porosity of the foamed metal is high, the foamed metal is deformed easily due to the low pressure resistance. If the foamed metal has a considerably low resistance, the dimension of the foamed metal changes easily when the load applied to the foamed metal changes during the power generation of the fuel cell. The dimensional change may decrease the surface pressure, and increase the resistance overpotential undesirably.

SUMMARY OF THE INVENTION

A general object of the present invention is to provide a simple, compact and economical fuel cell.

A main object of the present invention is to provide a simple, compact, and economical fuel cell having a desirable reactant gas flow field.

Another main object of the present invention is to provide a simple, compact, and economical fuel cell having a desirable reactant gas passage and a desirable seal.

Still another main object of the present invention is to provide a fuel cell in which no excessive pressure is applied to a metal foamed member of a diffusion member, and the foamed member is suitably protected.

According to the present invention, a diffusion member is in contact with an electrode catalyst layer. If an electrode and the diffusion member are combined together to function as a diffusion electrode, the diffusion electrode is in contact with an electrolyte membrane. If an electrode and an electrolyte membrane are combined together, the diffusion member is in contact the electrode.

In both cases, the diffusion member is basically in contact with the electrode catalyst layer. The diffusion member may include a foamed member made of metal material, and resinous flow field walls in the foamed member for forming a reactant gas flow field in the foamed member. A reactant gas flows through the reactant gas flow field along the electrode.

Since the foamed member itself forms the reactant gas flow field, it is not necessary to form any grooves in the separator or the diffusion member for the reactant gas flow field. Thus, the overall production cost for the fuel cell is effectively reduced, and the fuel cell is small. When separators in the form of metal plates are used in the fuel cell, since it is necessary to form any grooves in the metal separators by press forming, various types of the reactant gas flow fields can be designed freely without the constraints, and it is possible to produce thin separators. Further, since the separators are in surface to surface contact with the membrane electrode assembly, the electrical resistance in the thickness direction of the separators can be reduced, and the separators are highly resistant to shocks or impacts.

Further, the diffusion member in contact with the electrode catalyst layer may include a foamed member made of metal material, and resinous flow field walls in the foamed member for forming a reactant gas passage in the foamed member. A reactant gas flows through the reactant gas passage in the stacking direction. Simply by determining the shapes and positions of the resinous flow field walls, various shapes of reactant gas passages can be formed easily at arbitrary positions.

The resinous flow field walls are formed by impregnating the foamed member with resin. Thus, various shapes of the reactant gas flow fields and the reactant gas passages can be formed easily.

Further, the diffusion member in contact with the electrode catalyst layer may include a foamed member made of metal material, and a resinous seal in the foamed member for sealing the reactant gas passage. The reactant gas passage is formed in the resinous seal, and the reactant gas passage is sealed by the resinous seal.

Simply by providing the resinous seals in the foamed member, the reactant gas passages are formed in the resinous seals. Therefore, no complicated sealing structure is required, and the structure of the fuel cell is simple. Since the resinous seals are provided in the foamed member to improve the sealing characteristics, the leakage of the reactant gases is reliably prevented.

The resinous seals are formed by impregnating the foamed member with resin. Thus, various shapes of the reactant gas passages can be formed easily.

Further, the diffusion member may include a foamed member made of metal material, and a resinous support for supporting a load applied to the diffusion member in the stacking direction. Since the load applied to the diffusion member is supported by the resinous support, the foamed body of the diffusion member is not deformed plastically. Since the foamed member is not deformed undesirably, the resistance overpotential is not increased, and the desired power generation performance is effectively maintained.

Even though foamed members having high porosity are not mechanically strong, it is possible to use such foamed members for the diffusion members. Therefore, the gas diffusion properties are improved greatly. The weight of the entire fuel cell is small. Dedicated structures for protecting the diffusion members are not required. Thus, the overall size and weight of the fuel cell can be reduced easily.

The resinous supports may be formed in foamed member, and spaced by a predetermined distance from a surface of the electrode catalyst layer facing the foamed member. Therefore, the area of contact between the electrode and the foamed member made of metal material is not reduced. Thus, the desired power generation performance is maintained.

The resinous supports provided on one side of the electrolyte membrane and the resinous supports provided on the other side of the electrolyte membrane may be in alignment with each other in the stacking direction.

Therefore, when the membrane electrode assembly is swelled by absorbing water, or thermally expanded, or when the pressure of impacts or shocks is applied to the diffusion members, the load in the stacking direction can be reliably supported by the resinous supports. Therefore, the foamed members of the diffusion members are not deformed undesirably by compression.

A plurality of the fuel cells are stacked to form a fuel cell stack, and the resinous supports in each of the fuel cells may be in alignment with each other in the stacking direction. Thus, even if the fuel cell stack is compressed, the foamed members of the diffusion members in each of the fuel cells are not plastically deformed, and the overall power generation performance of the fuel cell stack is maintained desirably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
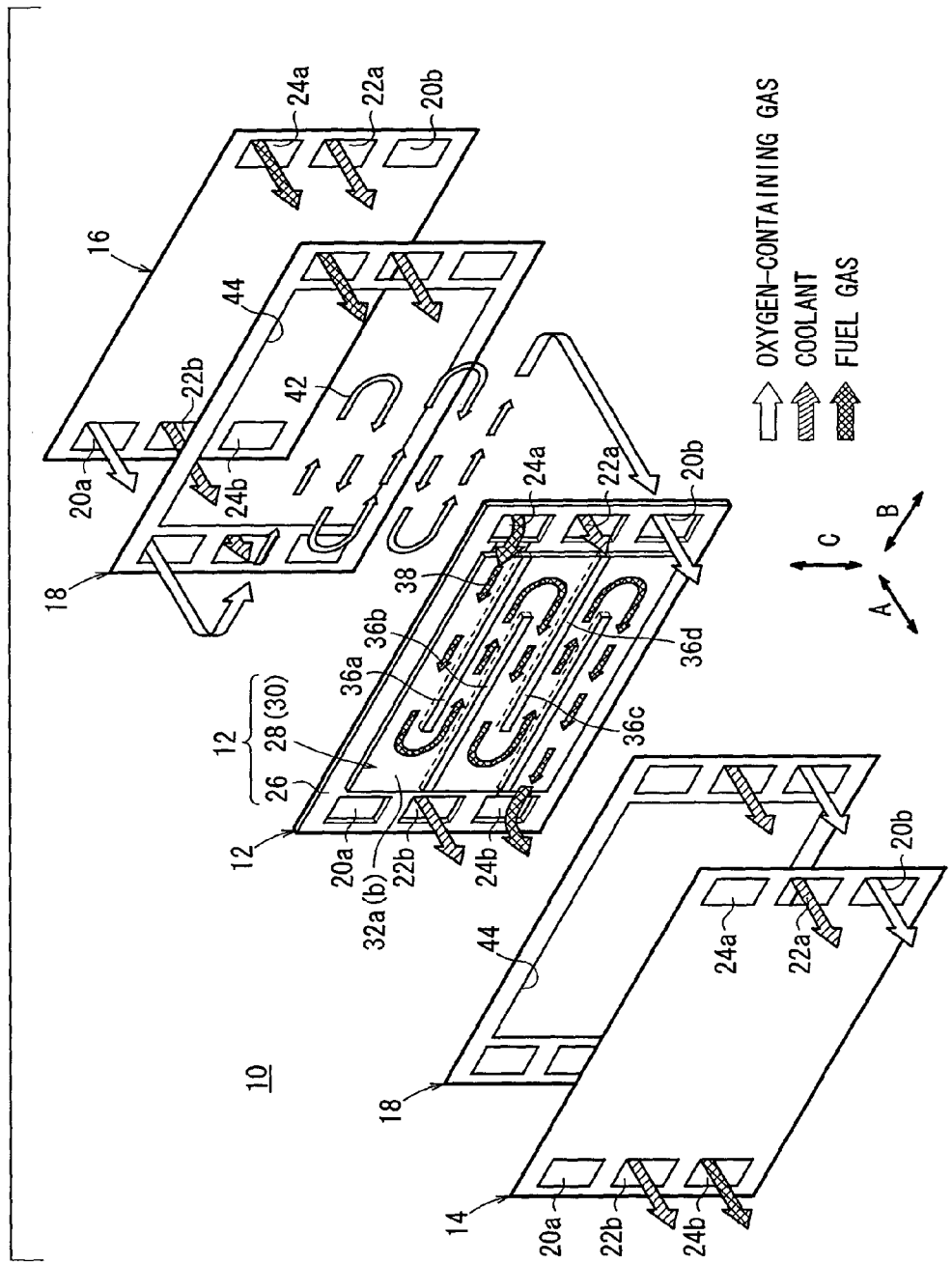
FIG. 1 is an exploded perspective view showing main components of a fuel cell according to a first embodiment of the present invention.
Figure 2:
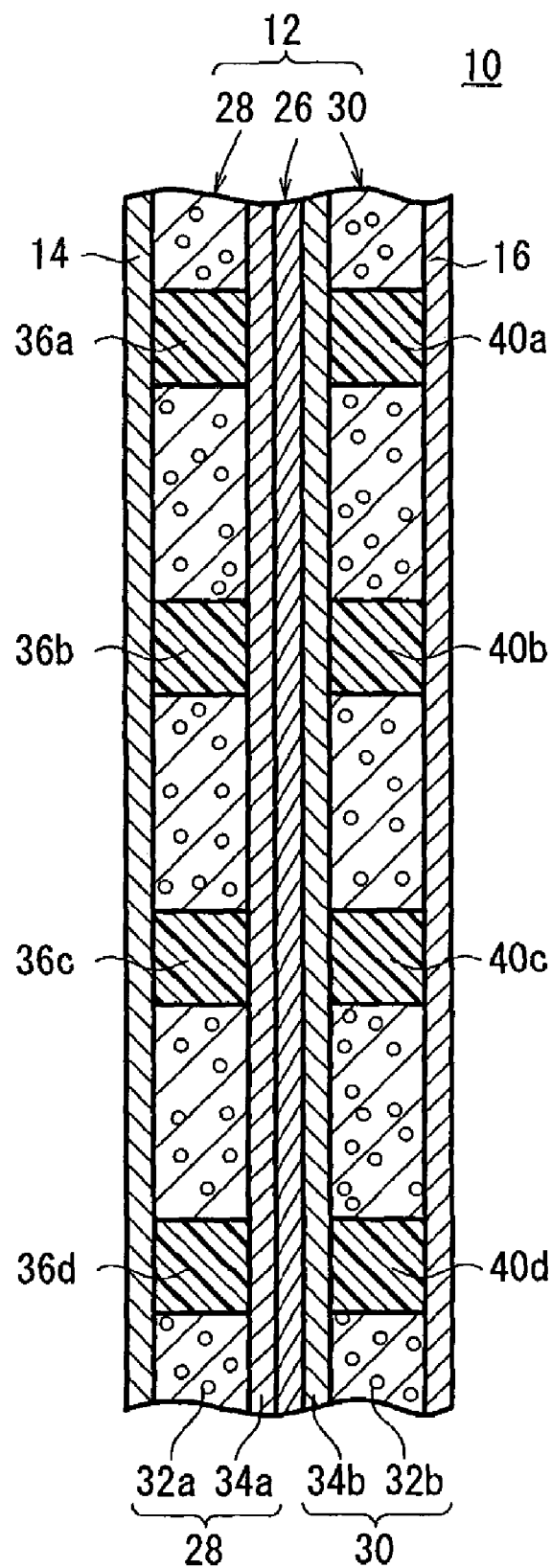
FIG. 2 is a cross sectional view showing main components of the fuel cell.

FIG. 1 is an exploded perspective view showing main components of a fuel cell 10 according to a first embodiment of the present invention. FIG. 2 is a cross sectional view showing main components of the fuel cell 10.

The fuel cell 10 includes a membrane electrode assembly 12, and first and second separators 14, 16 for sandwiching the membrane electrode assembly 12. Each of the separators 14, 16 is formed of a metal plate. Seal members 18 such as gaskets are inserted between the membrane electrode assembly 12 and the first separator 14, and the membrane electrode assembly 12 and the second separator 16, respectively, for sealing gas passages as described later on, and sealing electrode surfaces (power generation surfaces).

At one end of the fuel cell 10 in a direction indicated by an arrow B, an oxygen-containing gas supply passage 20a for supplying an oxygen-containing gas, a coolant discharge passage 22b for discharging a coolant, and a fuel gas discharge passage 24b for discharging a fuel gas such as a hydrogen-containing gas are arranged in a vertical direction indicated by an arrow C. The oxygen-containing gas supply passage 20a, the coolant discharge passage 22b, and the fuel gas discharge passage 24b extend through the fuel cell 10 in a stacking direction indicated by an arrow A.

At the other end of the fuel cell 10 in the direction indicated by the arrow B, a fuel gas supply passage 24a for supplying the fuel gas, a coolant supply passage 22a for supplying a coolant, and an oxygen-containing gas discharge passage 20b for discharging the oxygen-containing gas are arranged in the direction indicated by the arrow C. The fuel gas supply passage 24a, the coolant supply passage 22a, and the oxygen-containing gas discharge passage 20b extend through the fuel cell 10 in the direction indicated by the arrow A.

The membrane electrode assembly 12 comprises an anode 28, a cathode 30, and a solid polymer electrolyte membrane 26 interposed between the anode 28 and the cathode 30. The solid polymer electrolyte membrane 26 is formed by impregnating a thin membrane of perfluorosulfonic acid with water, for example.

As shown in FIG. 2, each of the anode 28 and the cathode 30 has a gas diffusion layer (diffusion member) 32a, 32b, and an electrode catalyst layer 34a, 34b of platinum alloy supported on porous carbon particles. The carbon particles of the electrode catalyst layer 34a, 34b are deposited uniformly on the surface of the gas diffusion layer 32a, 32b. The electrode catalyst layer 34a of the anode 28 and the electrode catalyst layer 34b of the cathode 30 are fixed to both surfaces of the solid polymer electrolyte membrane 26, respectively.

The gas diffusion layer 32a includes a foamed member having a good electrical conductivity. The foamed member is resistant to rust by water, and made of non-corrosive metal material in the presence of a strong acid. For example, stainless steel, titanium, or nickel are used as the metal material. Resinous flow field walls 36a, 36b, 36c, and 36d are formed in the foamed member by impregnation, for example. The resinous flow field walls 36a through 36d are made of thermoplastic resin or thermosetting resin. As shown in FIG. 1, the resinous flow field walls 36a through 36d extend from opposite ends of the anode 28 alternately in the direction indicated by the arrow B. Thus, a fuel gas flow passage (reactant gas flow field) 38 is formed in a serpentine pattern by the resinous flow field walls 36a through 36d in the gas diffusion layer 32a. The fuel gas flow passage 38 is connected to the fuel gas supply passage 24a at one end, and connected to the fuel gas discharge passage 24b at the other end.

Figure 3:
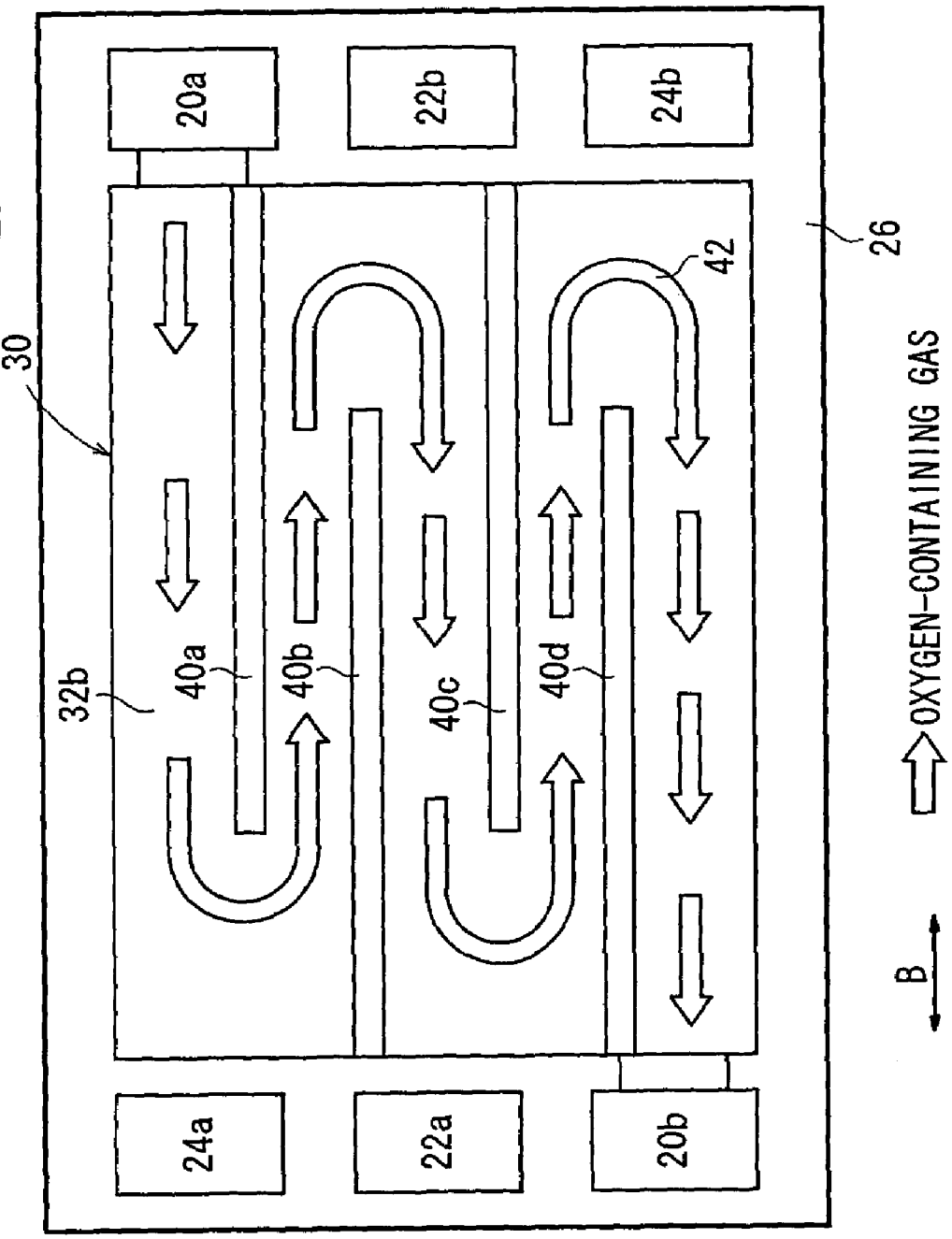
FIG. 3 is a front view showing a membrane electrode assembly of the fuel cell.

As shown in FIGS. 2 and 3, the gas diffusion layer 32b includes a foamed member made of metal material as with the gas diffusion layer 32a. Resinous flow field walls 40a, 40b, 40c, and 40d are formed in the foamed member by impregnation, for example. The resinous flow field walls 40a through 40d extend from opposite ends of the cathode 30 alternately in the direction indicated by the arrow B. Thus, an oxygen-containing gas flow passage 42 (reactant gas flow field) is formed in a serpentine pattern in the gas diffusion layer 32b. The oxygen-containing gas flow passage 42 is connected to the oxygen-containing gas supply passage 20a at one end, and connected to the oxygen-containing gas discharge passage 20b at the other end.

As shown in FIG. 1, each of the seal members 18 has an opening 44 at its central position corresponding to the anode 28 or the cathode 30. Though not illustrated in the drawings, a coolant flow passage is formed between adjacent fuel cells 10 stacked to form a fuel cell stack. The coolant flow passage is connected to the coolant supply passage 22a at one end, and connected to the coolant discharge passage 22b at the other end.

Next, operation of the fuel cell 10 will be described below.

A fuel gas such as a hydrogen-containing gas is supplied to the fuel gas supply passage 24a, and an oxygen-containing gas is supplied to the oxygen-containing gas supply passage 20a.

In the membrane electrode assembly 12, the fuel gas from the fuel gas supply passage 24a is supplied to the anode 28. At the anode 28, the fuel gas flow passage 38 is formed by the resinous flow field walls 36a through 36d in the gas diffusion layer (foamed member) 32a. The fuel gas flows through the fuel gas flow passage 38 in the gas diffusion layer 32a in the serpentine pattern, along the surface of the electrode catalyst layer 34a to induce a chemical reaction at the anode 28.

Further, in the membrane electrode assembly 12, the oxygen-containing gas from the oxygen-containing gas supply passage 20a is supplied to the cathode 30. At the cathode 30, as shown in FIG. 3, the oxygen-containing gas flow passage 42 is formed by the resinous flow field walls 40a through 40d in the gas diffusion layer (foamed member) 32b. The oxygen-containing gas flows through the oxygen-containing gas flow passage 42 in the gas diffusion layer 32b in the serpentine pattern, along the surface of the electrode catalyst layer 34b to induce a chemical reaction at the cathode 30.

In the membrane electrode assembly 12, the fuel gas supplied to the anode 28, and the oxygen-containing gas supplied to the cathode 30 are consumed in the electrochemical reactions at the electrode catalyst layers 34a, 34b of the anode 28 and the cathode 30 for generating electricity.

The fuel gas is consumed at the anode 28, and discharged into the fuel gas discharge passage 24b in the direction indicated by the arrow A. Similarly, the oxygen-containing gas is consumed at the cathode 30, and discharged into the oxygen-containing gas discharge passage 20b in the direction indicated by the arrow A.

In the first embodiment, the gas diffusion layer 32a of the anode 28, and the gas diffusion layer 32b of the cathode 30 include foamed members made of metal material. The resinous flow field walls 36a through 36d, and 40a through 40d are provided in the respective foamed members by impregnation. The area in the gas diffusion layer 32a is divided by the resinous flow field walls 36a through 36d to form the serpentine fuel gas flow passage 38. The area in the gas diffusion layer 32b is divided by the resinous flow field walls 40a through 40d to form the serpentine oxygen-containing gas flow passage 42.

It is not necessary to form any grooves in the first and second metal separators 14, 16 or the gas diffusion layers 32a, 32b for the reactant gas flow fields. Thus, the overall production cost for the fuel cell 10 is effectively reduced. Since it is necessary to form any grooves in the first and second metal separators 14, 16 by press forming, the cost for press dies is reduced. The first and second metal separators 14, 16 without any grooves can be very thin, and thus, the dimension of the fuel cell 10 in the stacking direction can be reduced significantly.

Since it is necessary to form any grooves in the first and second metal separators 14, 16 by press forming, various types of the fuel gas flow passage 38 and the oxygen-containing gas flow passage 42 can be designed freely without the constraints.

Further, the first and second separators 14, 16 are in the form of metal plates having even surfaces without any grooves. In contrast to the conventional metal separators having grooves or protrusions for forming the reactant gas flow fields, in the first and second metal separators 14, 16, the surface pressure is not increased when an external force is applied to the fuel cell 10, and the electrical resistance in the thickness direction of the first and second metal separators 14, 16 is reduced.

Figure 4:
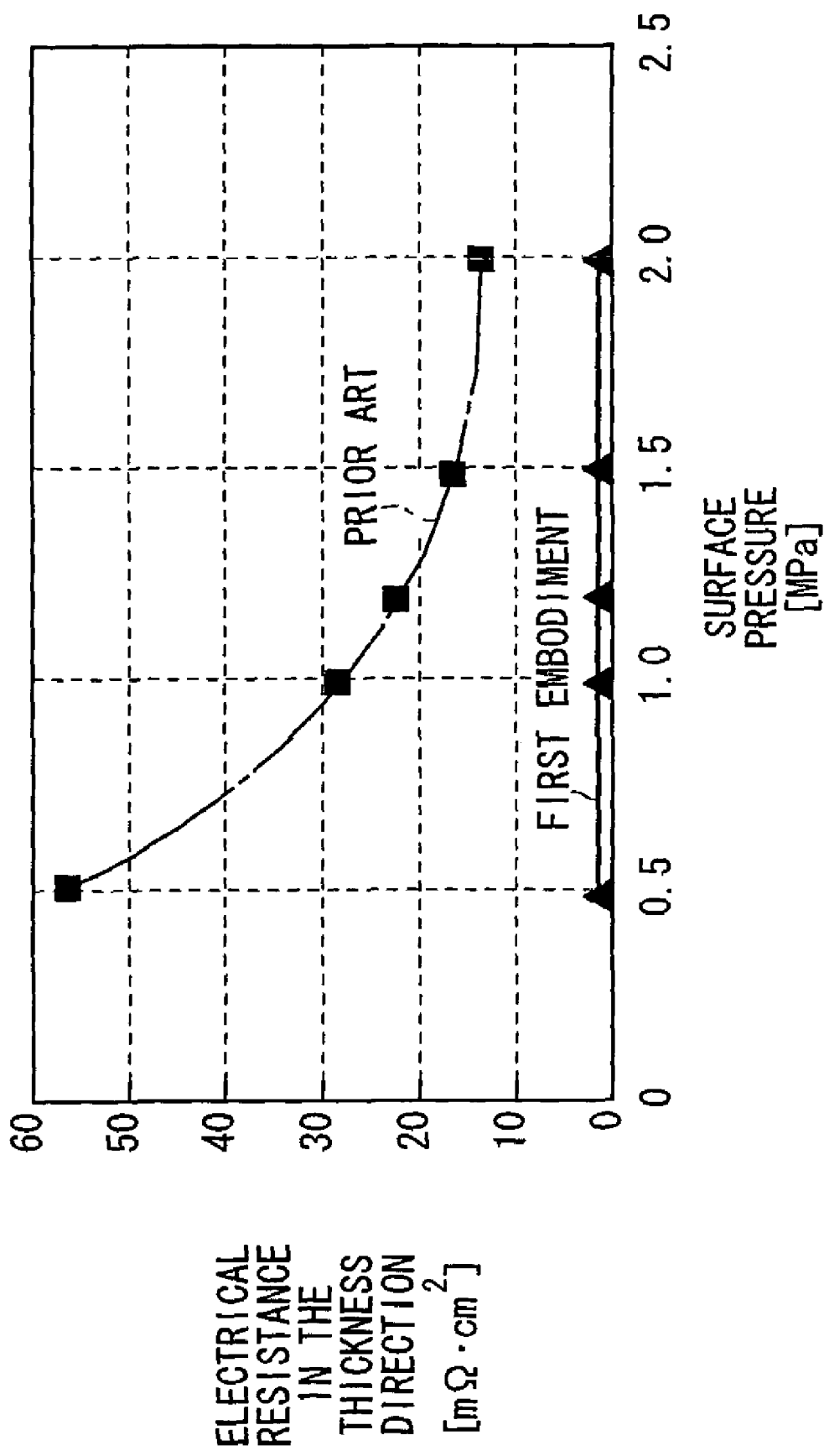
FIG. 4 is a graph showing the relationship between the surface pressure and the electrical resistance in the thickness direction of a separator in the prior art, and the relationship between the surface pressure and the electrical resistance in the thickness direction of a separator in the first embodiment.

FIG. 4 shows the relationship between the surface pressure and the electrical resistance in the thickness direction in the prior art, i.e., the electrical resistance by the contact between an uneven surface of a conventional metal separator and a carbon paper. Further, FIG. 4 shows the relationship between the surface pressure and the electrical resistance in the thickness direction in the first embodiment of the present invention, i.e., the electrical resistance by the contact between the even surface of the metal separator 14, 16 and the foamed member made of metal material. As shown in FIG. 4, it is apparent that the electrical resistance in the first embodiment is considerably low in contrast to the case of the prior art.

In the first embodiment, the resinous flow field walls 36a through 36d are formed in the foamed member of the gas diffusion layer 32a by impregnation, and the resinous flow field walls 40a through 40d are formed in the foamed member of the gas diffusion layer 32b by impregnation. Therefore, the fuel gas flow passage 38 and the oxygen-containing gas flow passage 42 can be formed in various shapes easily.

Figure 5:
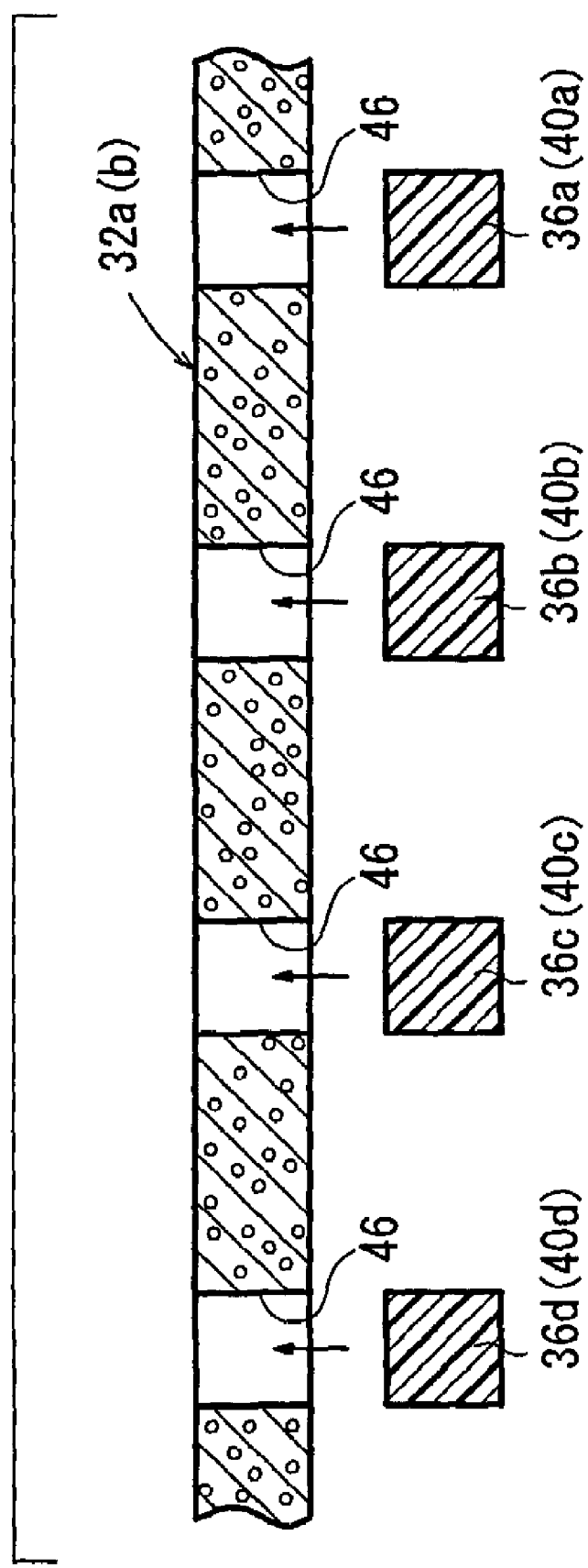
FIG. 5 is a view showing a step of inserting resinous flow field walls into a foamed member separately.

As shown in FIG. 5, the foamed member of the gas diffusion layer 32a or 32b may have openings 46 for fixedly inserting preformed resinous flow field walls 36a through 36d or 40a through 40d.

Figure 6:
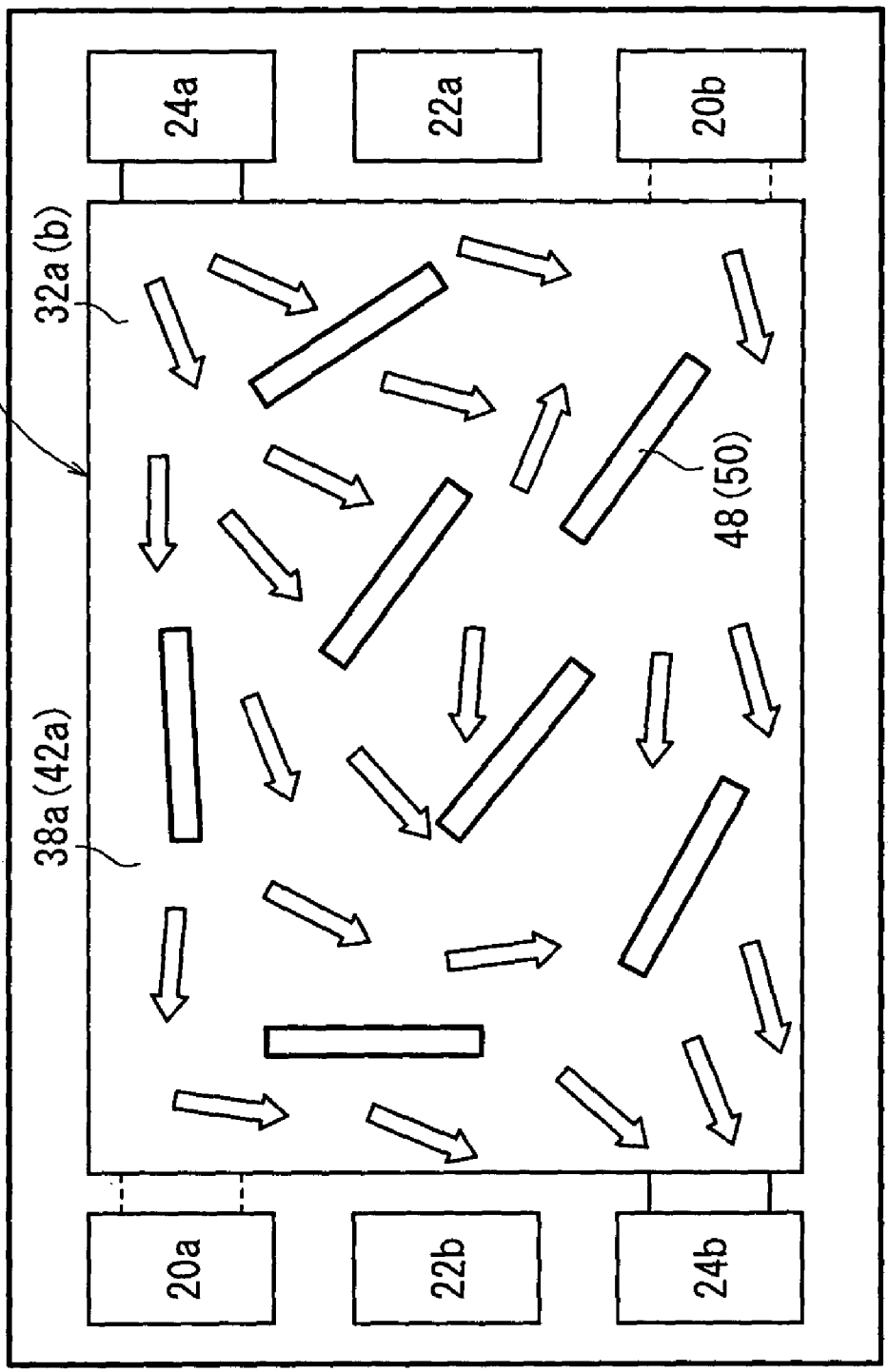
FIG. 6 is a front view showing the membrane electrode assembly in which the resinous flow field walls are positioned randomly.

In the first embodiment, each of the fuel gas flow passage 38 and the oxygen-containing gas flow passage 42 is formed in the serpentine pattern. Alternatively, as shown in FIG. 6, a fuel gas flow field 38a or an oxygen-containing gas flow field 42a may be formed to have a random flow pattern. The fuel gas flow field 38a or the oxygen-containing gas flow field 42a is formed in the gas diffusion layer 32a or 32b by providing a plurality of resinous flow field walls 48 or 50 by impregnation, or by insertion. The resinous flow field walls 48 or 50 extend in various directions in the anode 28 or the cathode 30.

Simply by providing the resinous flow field walls 48 in the anode 28, and providing the resinous flow field walls 50 in the cathode 30, various shapes of the fuel gas flow field 38a, and the oxygen-containing gas flow field 42a can be formed easily.

Figure 7:
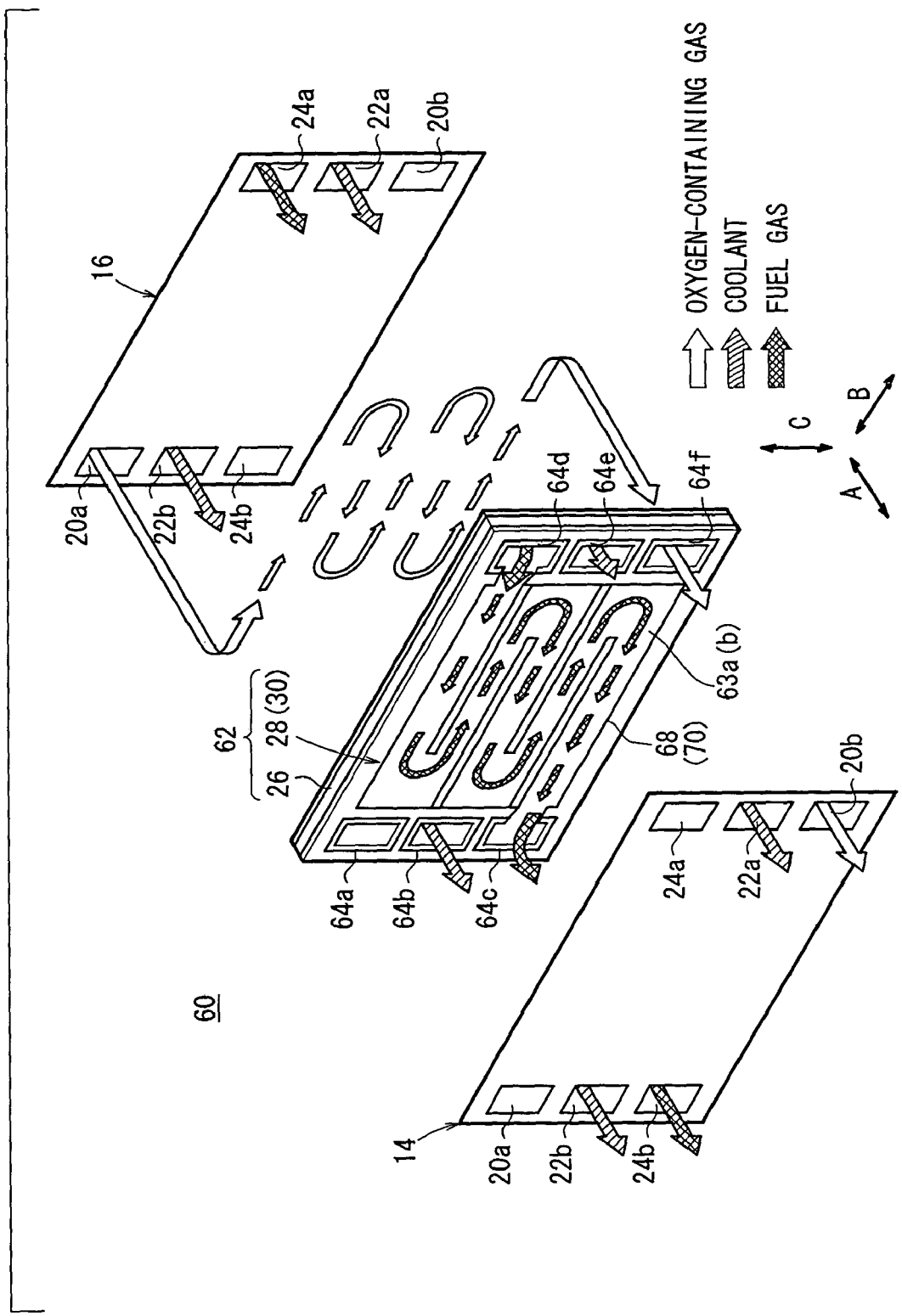
FIG. 7 is an exploded perspective view showing main components of a fuel cell according to a second embodiment of the present invention.
Figure 8:
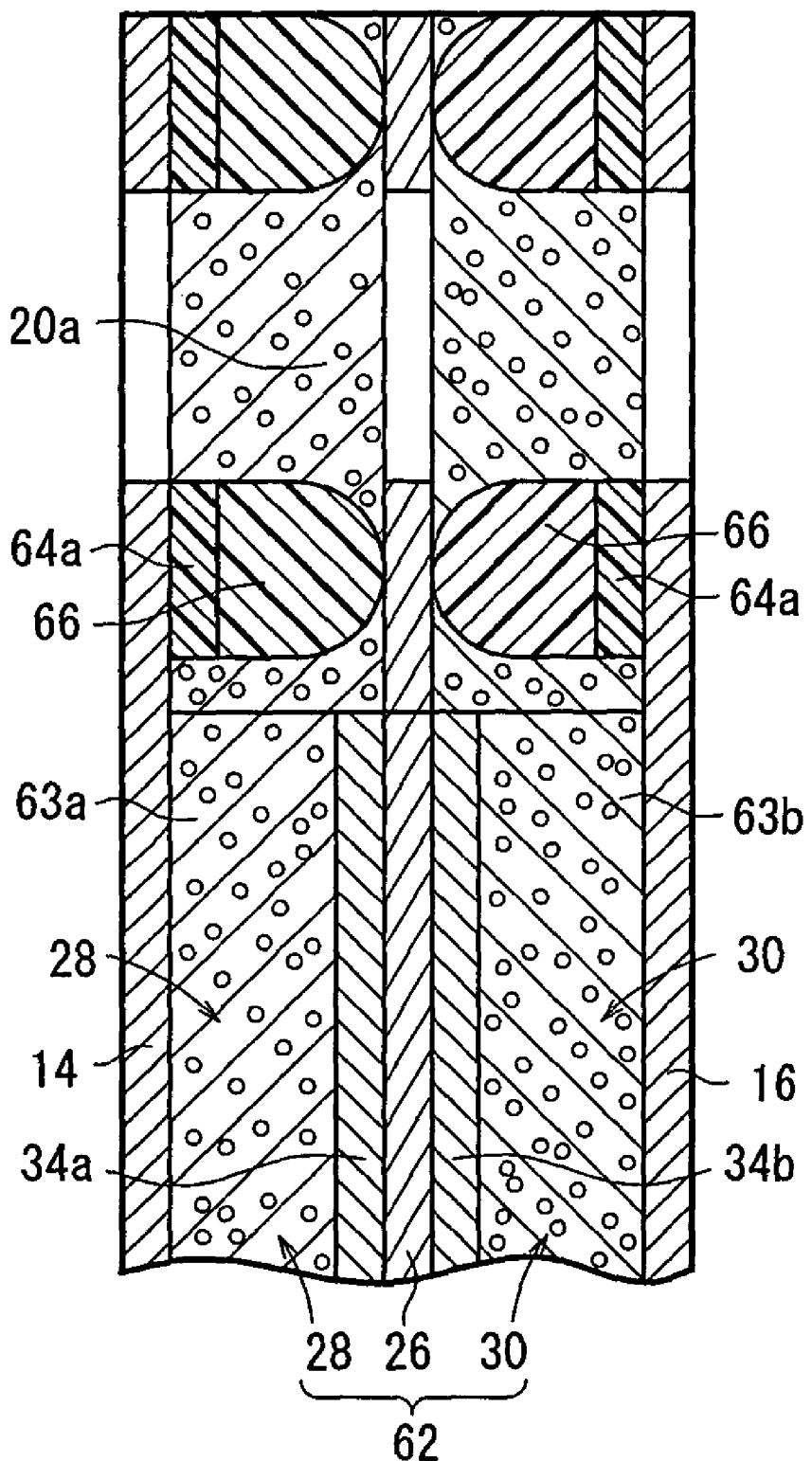
FIG. 8 is a cross sectional view showing main components of the fuel cell.

FIG. 7 is an exploded perspective view showing main components of a fuel cell 60 according to a second embodiment of the present invention, and FIG. 8 is a cross sectional view showing main components of the fuel cell 60. The constituent elements that are identical to those of the fuel cell 10 according to the first embodiment are labeled with the same reference numeral, and description thereof is omitted. Similarly, in third through sixth embodiments as described later, the constituent elements that are identical to those of the fuel cell 10 according to the first embodiment are labeled with the same reference numeral, and description thereof is omitted.

The fuel cell 60 has a membrane electrode assembly 62. As shown in FIG. 8, the membrane electrode assembly 62 has an anode 28 including a gas diffusion layer (diffusion member) 63a, and a cathode 30 including a gas diffusion layer (diffusion member) 63b. The gas diffusion layers 63a, 63b have a shape substantially identical to a shape of the solid polymer electrolyte membrane 26 in a front view. Resinous flow field walls 64a through 64f are provided at opposite ends of the gas diffusion layers 63a by impregnation or post-forming process such as insertion.

The resinous flow field walls 64a through 64f has a substantially rectangular ring-shape. An oxygen-containing gas supply passage 20a, a coolant discharge passage 22b, a fuel gas discharge passage 24b, a fuel gas supply passage 24a, a coolant supply passage 22a and an oxygen-containing gas supply passage 20b are formed to extend through the foamed member in the resinous flow field walls 64a through 64f.

Each of the resinous flow field walls 64a through 64f may have a resinous seal 66 for sealing the reactant gas passage as necessary. The resinous seal 66 is formed by co-injection molding (double molding), for example.

A resinous flow field wall 68 is provided in the anode 28 for limiting the area of a fuel gas flow field 38, and a resinous flow field wall 70 is provided in the cathode 30 for limiting the area of an oxygen-containing gas flow field 42.

In the fuel cell 60, simply by providing the resinous seals 66, the leakage of the fuel gas and the oxygen-containing gas is reliably prevented, and the sealing characteristics are improved with the simple sealing structure. Unlike the sealing structure which is provided separately, the positional alignment operation is not required. Therefore, the fuel cell 60 can be assembled easily.

In the second embodiment, the resinous seals 66 are provided in the resinous flow field walls 64a through 64f by co-injection molding as necessary. Alternatively, the resinous seals 66 may be provided in the foamed member by impregnation, or attached to the foamed member to form the reactant gas passages such as the oxygen-containing gas supply passage 20a.

Figure 9:
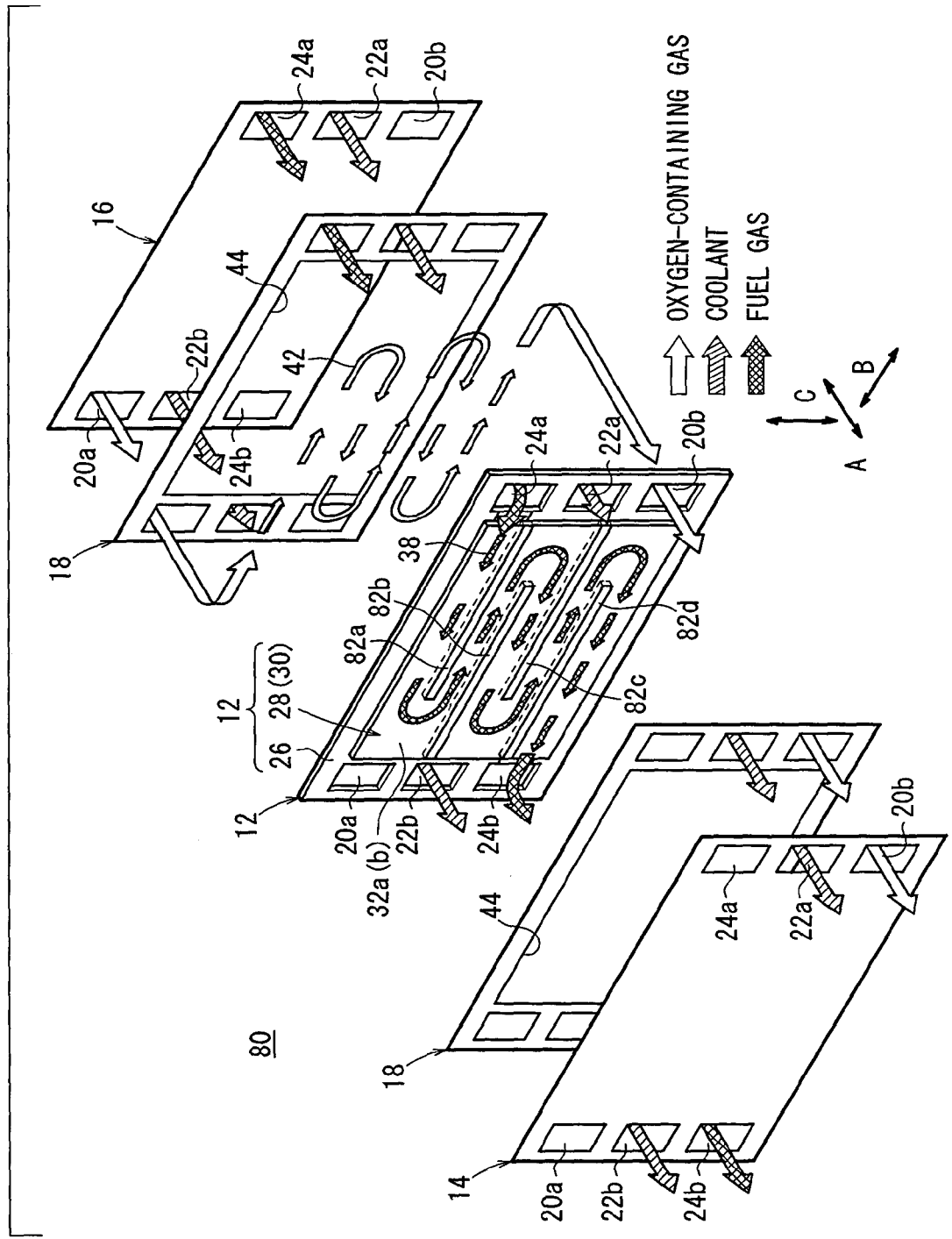
FIG. 9 is an exploded perspective view showing main components of a fuel cell according to a third embodiment of the present invention.
Figure 10:
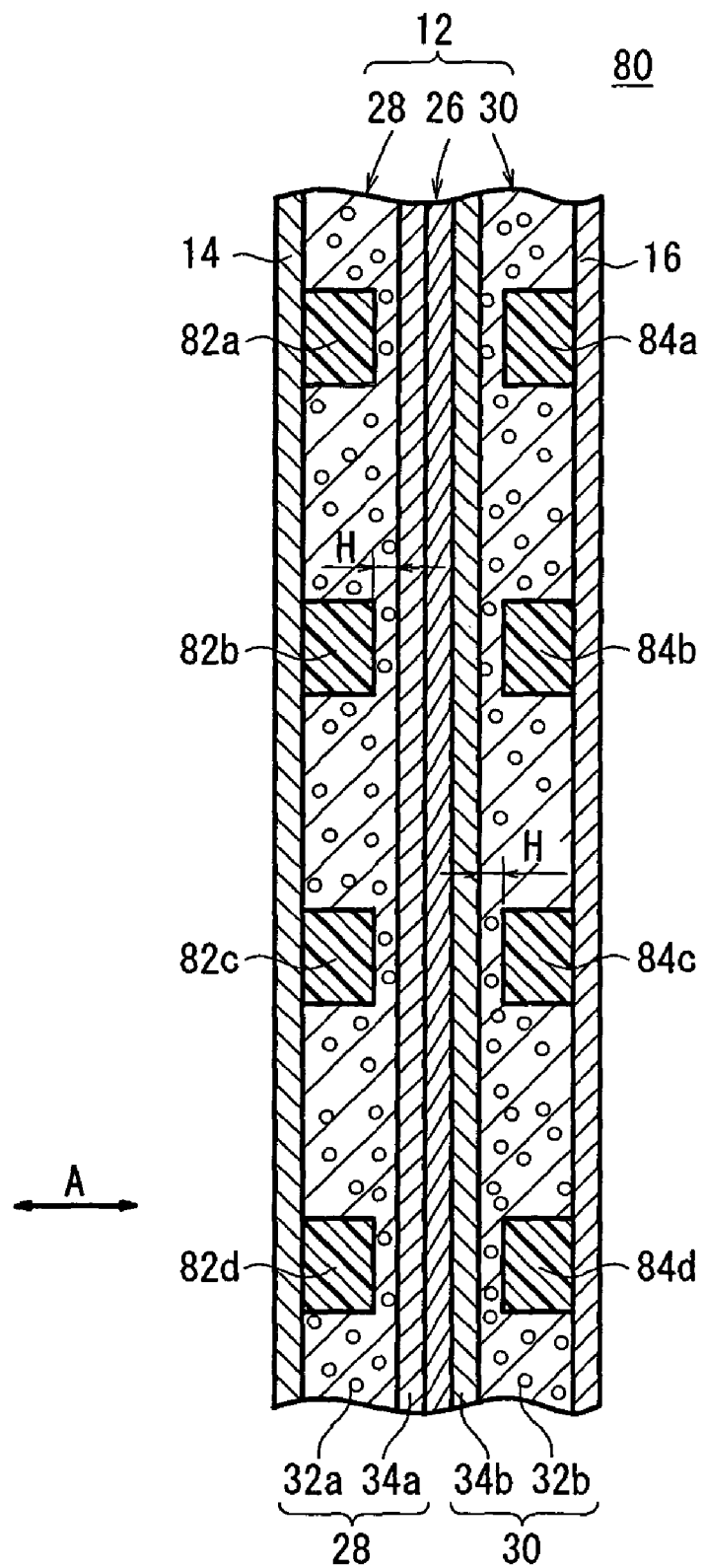
FIG. 10 is a cross sectional view showing main components of the fuel cell.

FIG. 9 is an exploded perspective view showing main components of a fuel cell 80 according to a third embodiment of the present invention. FIG. 10 is a cross sectional view showing main components of the fuel cell 80.

In the fuel cell 80, resinous supports 82a, 82b, 82c, and 82d are provided in the foamed member of a gas diffusion layer 32a by impregnation for example, for supporting the load applied to the gas diffusion layer 32a in the stacking direction. The resinous supports 82a through 82d are made of thermoplastic resin or thermosetting resin.

The resinous supports 82a through 82d have a long square bar shape. The resinous supports 82a through 82d extend from opposite ends of the anode 28 alternately in the direction indicated by the arrow B (see FIG. 9). As shown in FIG. 10, the resinous supports 82a through 82d are spaced from a predetermined distance H from a surface of an electrode catalyst layer 34a which contacts (faces) the gas diffusion layer 32a.

Resinous supports 84a, 84b, 84c, and 84d are formed in the foamed member of the gas diffusion layer 32b by impregnation, for example. The resinous supports 84a through 84d extend from opposite ends of the cathode 30 alternately in the direction indicated by the arrow B.

The solid polymer electrolyte membrane 26 is interposed between the resinous supports 82a through 82d, and the resinous supports 84a through 84d. The resinous supports 82a through 82d are positioned in alignment with the resinous supports 84a through 84d in the stacking direction indicated by the arrow A. The resinous supports 84a through 84d are spaced from a predetermined distance H from a surface of an electrode catalyst layer 34b which contacts (faces) the gas diffusion layer 32b.

In the third embodiment, the gas diffusion layer 32a of the anode 28 includes the foamed member made of metal material, and the gas diffusion layer 32b of the cathode 30 includes the foamed member made of metal material. The resinous supports 82a through 82d are provided in the foamed member of the anode 28, and the resinous supports 84a through 84d are provided in the foamed member of the cathode 30 by impregnation, for example.

Therefore, when the membrane electrode assembly 26 is swelled by absorbing water, or thermally expanded, or when the pressure of impacts or shocks are applied to the gas diffusion layers 32a, 32b, the load in the stacking direction can be reliably supported by the resinous supports 82a through 82d, and 84a through 84d. Therefore, the foamed members of the gas diffusion layers 32a, 32b are not plastically deformed. The resistance overpotential is not increased due to the deformation of the foamed members. Thus, the desired power generation performance is effectively maintained.

The solid polymer electrolyte membrane 26 is interposed between the resinous supports 82a through 82d, and the resinous supports 84a through 84d. The resinous supports 82a through 82d are positioned in alignment with the resinous supports 84a through 84d in the stacking direction indicated by the arrow A (see FIG. 10). Therefore, the gas diffusion layers 32a, 32b are not deformed by compression. The mechanical compression of the foamed members of the gas diffusion layers 32a, 32b is prevented reliably.

Even though foamed members having high porosity are not mechanically strong, it is possible to use such foamed members for the gas diffusion layers 32a, 32b. Therefore, the gas diffusion properties are improved greatly. The weight of the entire fuel cell 80 is small. Dedicated structures for protecting the gas diffusion layers 32a, 32b are not required. Thus, the overall size and weight of the fuel cell 80 can be reduced easily.

As shown in FIG. 10, the resinous supports 82a through 82d are spaced from the predetermined distance H from the surface of the electrode catalyst layer 34a which contacts the gas diffusion layer 32a, and the resinous supports 84a through 84d are spaced from the predetermined distance H from the surface of the electrode catalyst layer 34b which contacts the gas diffusion layer 32b. In the anode 28, the area of contact between the electrode catalyst layer 34a and the foamed member made of metal material is not reduced by providing the resinous supports 82a through 82d. In the cathode 30, the area of contact between the electrode catalyst layer 34 and the foamed member made of metal material is not reduced by providing the resinous supports 84a through 84d. Thus, the desired power generation performance is maintained.

Figure 11:
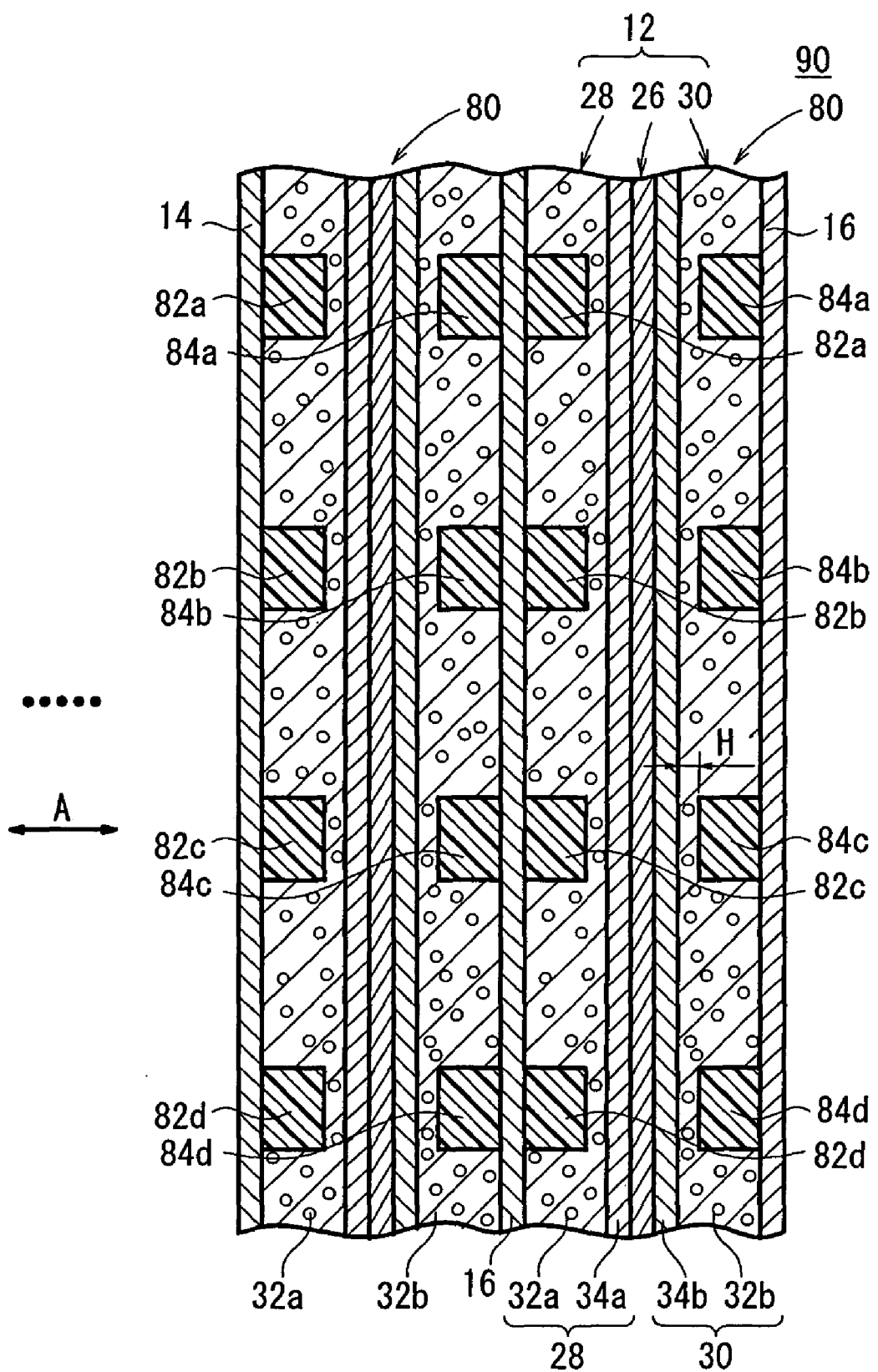
FIG. 11 is a cross sectional view showing main components of a fuel cell stack formed by stacking a plurality of the fuel cells.

As shown in FIG. 11, a plurality of the fuel cells 80 are stacked together in the stacking direction indicated by the arrow A to form a fuel cell stack 90. The resinous supports 82a through 82d are positioned in alignment with the resinous supports 84a through 84d in the stacking direction indicated by the arrow A. Therefore, even if the fuel cell stack 90 is compressed, the foamed members of the gas diffusion layers 32a, 32b are not deformed plastically in each of the fuel cells 80. Thus, the overall power generation performance of the fuel cell stack 90 is desirably maintained.

Figure 12:
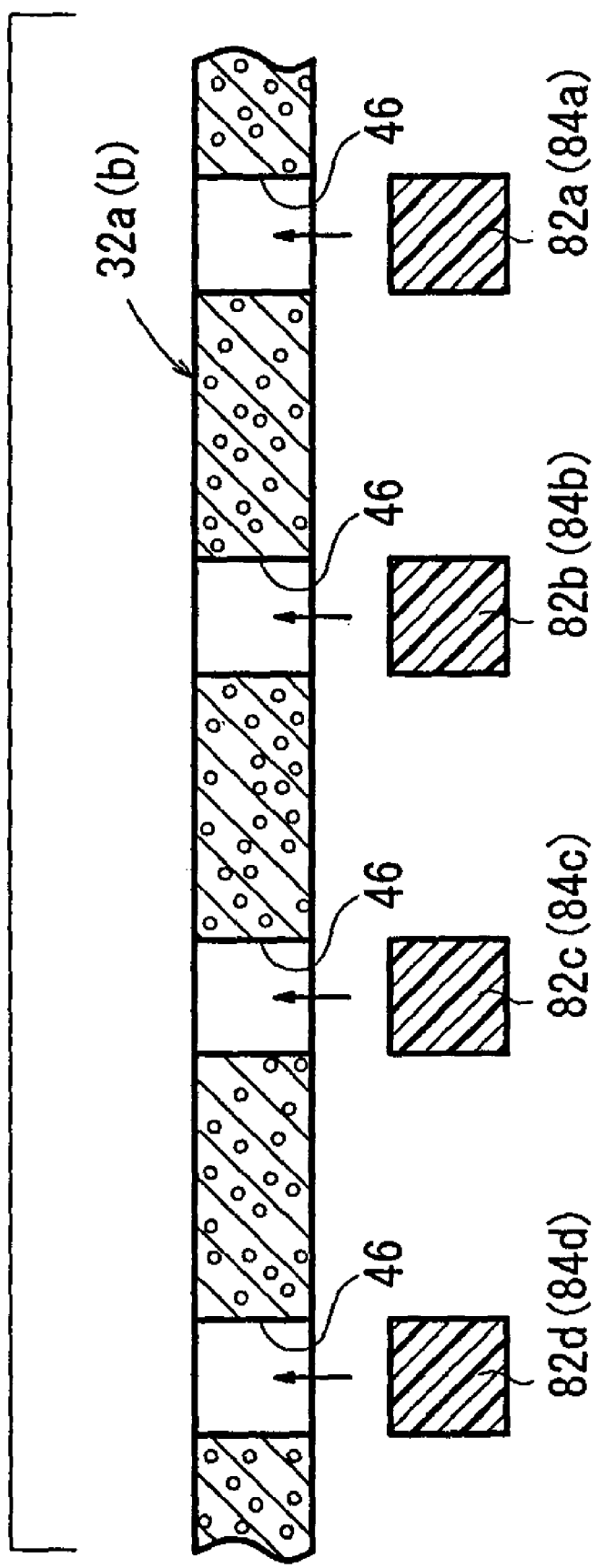
FIG. 12 is a view showing a step of inserting resinous supports into a foamed member separately.

As shown in FIG. 12, instead of using impregnation, the foamed member of the gas diffusion layer 32a or 32b may have openings 46 for fixedly inserting preformed resinous supports 82a through 82d or 84a through 84d.

Figure 13:
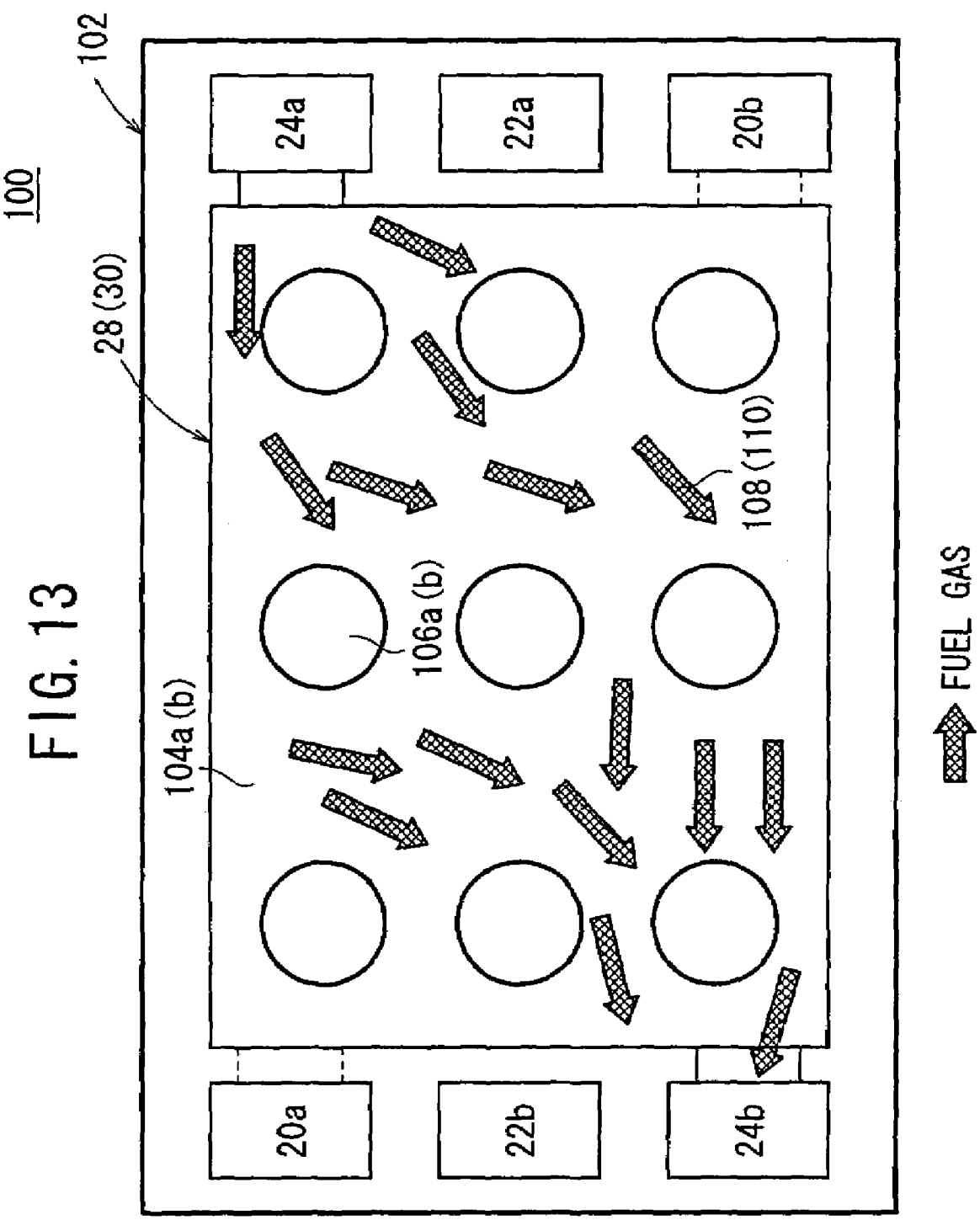
FIG. 13 is a front view showing a membrane electrode assembly of a fuel cell according to a fourth embodiment of the present invention.
Figure 14:
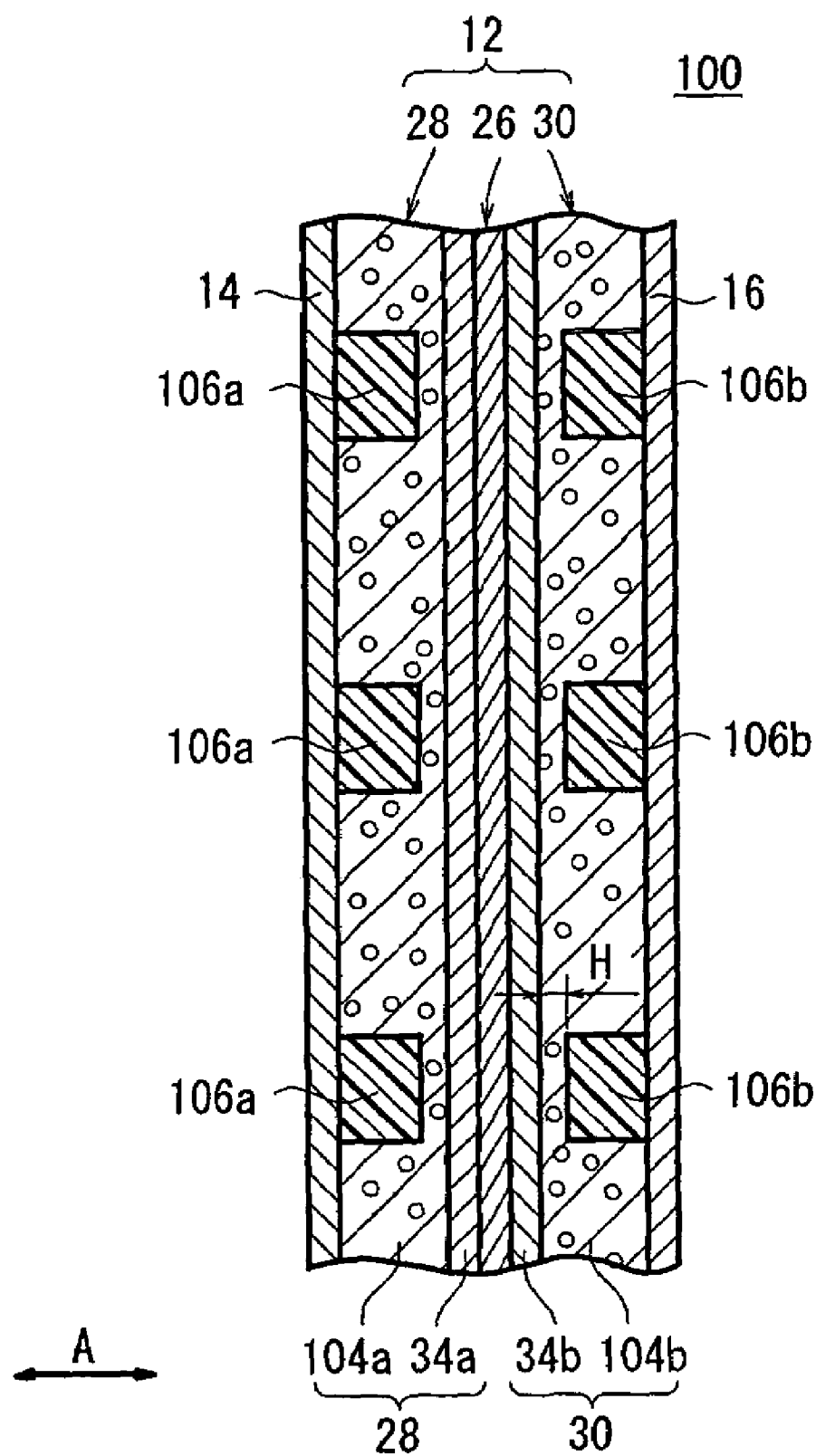
FIG. 14 is a cross sectional view showing main components of the fuel cell.

FIG. 13 is a front view showing a membrane electrode assembly 102 of a fuel cell 100 according to a fourth embodiment of the present invention. FIG. 14 is a cross sectional view showing main components of the fuel cell 100.

The membrane electrode assembly 102 has an anode 28 including a gas diffusion layer 104a, and a cathode 30 including a gas diffusion layer 104b. The gas diffusion layers 104a, 104b include foamed members made of metal material such as stainless steel. Resinous supports 106a are provided in the foamed member of the gas diffusion layer 104a, and resinous supports 106b are provided in the foamed member of the gas diffusion layer 104b. The resinous supports 106a, 106b are formed by impregnation, for example. The resinous supports 106a, 106b are made of thermoplastic resin or thermosetting resin.

The resinous supports 106a, 106b have a columnar shape, and function as stoppers for preventing the foamed members from being deformed plastically. The solid polymer electrolyte membrane 26 is interposed between the resinous supports 106a and the resinous supports 106b. The resinous supports 106a are positioned in alignment with the resinous supports 106b in the stacking direction indicated by the arrow A (see FIG. 14). The resinous supports 106a are spaced from a predetermined distance H from a surface of an electrode catalyst layer 34a which contacts (faces) the gas diffusion layer 104a. The resinous supports 106b are spaced from the predetermined distance H from a surface of an electrode catalyst layer 34b which contacts (faces) the gas diffusion layer 104b. The resinous supports 106a form a fuel gas flow field 108 in the gas diffusion layer 104a, and the resinous supports 106b form an oxygen-containing gas flow field 110 in the gas diffusion layer 104b.

Figure 15:
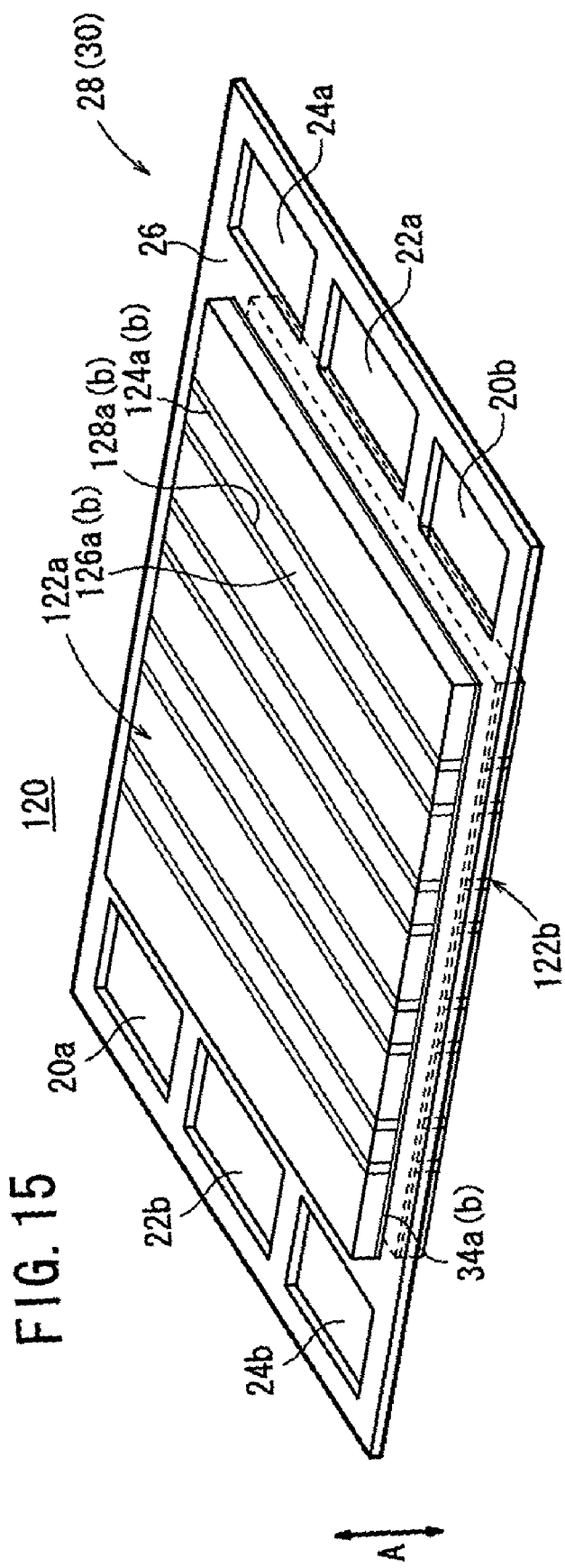
FIG. 15 is a perspective view showing a membrane electrode assembly of a fuel cell according to a fifth embodiment of the present invention.

FIG. 15 is a perspective view showing a membrane electrode assembly 120 of a fuel cell according to a fifth embodiment of the present invention.

The membrane electrode assembly 120 has an anode 28 including a gas diffusion layer 122a, and a cathode 30 including a gas diffusion layer 122b. The gas diffusion layers 122a, 122b include foamed members made of metal material as with the gas diffusion layer 32a. Resinous supports 124a are provided in the foamed member of the gas diffusion layer 122a, and resinous supports 124b are provided in the foamed member of the gas diffusion layer 122b. The resinous supports 124a, 124b are formed by impregnation. The resinous supports 124a, 124b are made of thermoplastic resin or thermosetting resin. Metal stoppers 126a, 126b are interposed between the resinous supports 124a, and between the resinous supports 124b, respectively.

The metal stoppers 126a and 126b have a long square bar shape. A solid polymer electrolyte membrane 26 is interposed between the resinous supports 124a and 124b. The resinous supports 124a are positioned in alignment with the resinous supports 124b in the stacking direction indicated by the arrow A for supporting the load applied to the gas diffusion layers 122a, 122b in the stacking direction. The metal stoppers 126a, 126b are fixedly provided in the openings 128a, 128b between the resinous supports 124a, 124b which are formed by impregnation, respectively.

In the fifth embodiment, the load applied to the gas diffusion layers 122a, 122b in the stacking direction can be reliably supported by the metal stoppers 126a, 126b. Since the metal stoppers 126a, 126b contact first and second metal separator (not shown), the area of contact between the electrically conductive surfaces is not reduced.

Figure 16:
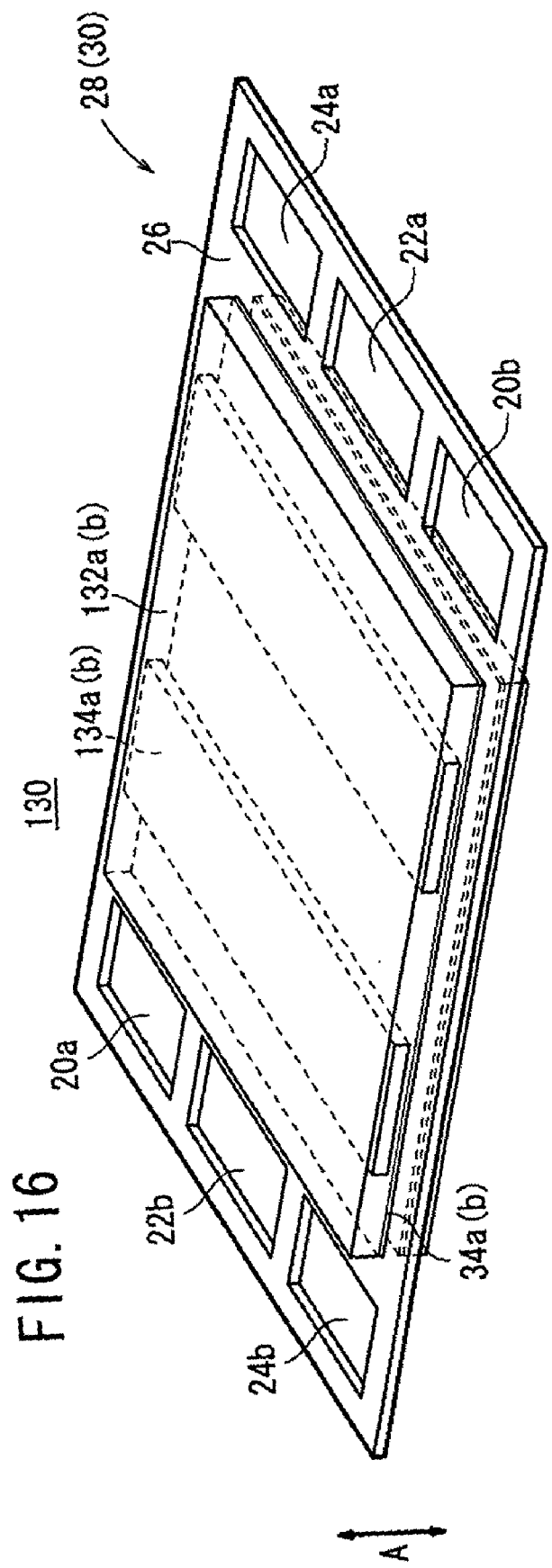
FIG. 16 is a perspective view showing a membrane electrode assembly of a fuel cell according to a sixth embodiment of the present invention.
Figure 17:
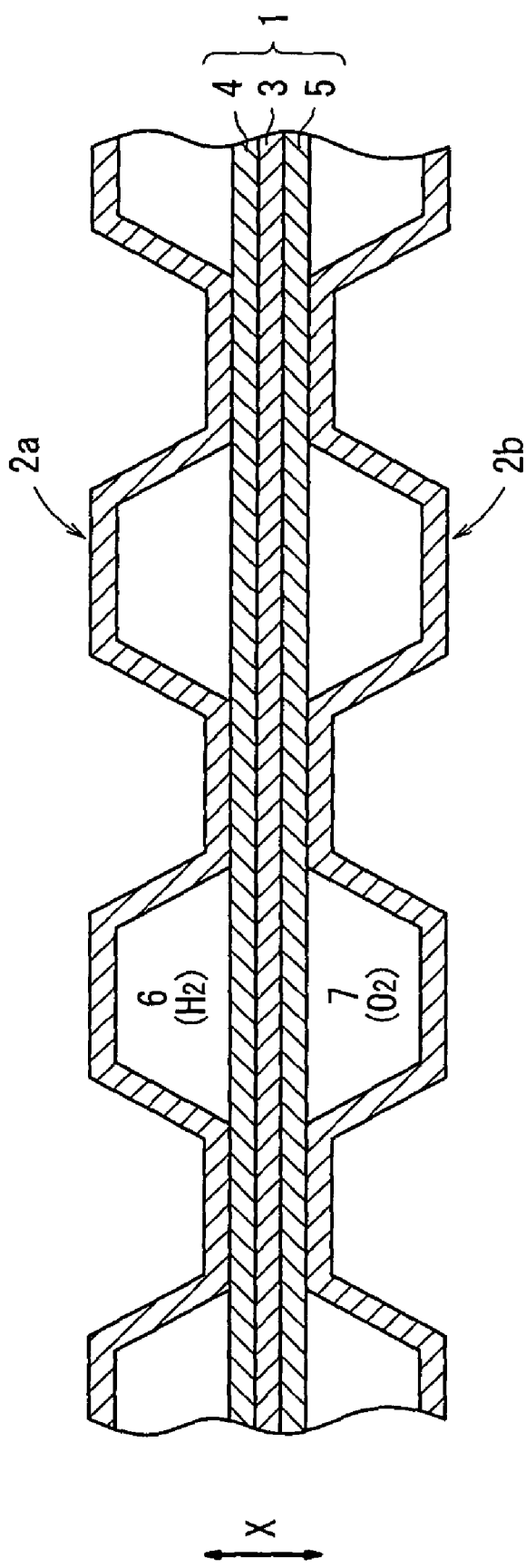
FIG. 17 is a cross sectional view showing a part of a conventional fuel cell.

FIG. 16 is a perspective view showing a membrane electrode assembly 130 of a fuel cell according to the sixth embodiment of the present invention.

The membrane electrode assembly 130 has an anode 28 including a gas diffusion layer 132a, and a cathode 30 including a gas diffusion layer 132b. The gas diffusion layers 132a, 132b include foamed members made of metal material as with the gas diffusion layer 32a. Resinous supports 134a are formed in the foamed member of the gas diffusion layer 132a, and resinous supports 134b are formed in the foamed member of the gas diffusion layer 132b. The resinous supports 134a, 134b are formed by impregnation. The resinous supports 134a, 134b are made of thermoplastic resin or thermosetting resin.

The resinous supports 134a, 134b have a long planar plate shape. A solid polymer electrolyte membrane 26 is interposed between the resinous supports 134a and 134b. The resinous supports 134a are positioned in alignment with the resinous supports 134b in the stacking direction indicated by the arrow A for supporting the load applied to the gas diffusion layers 132a, 132b in the stacking direction.

The resinous supports 134a, 134b are embedded in the gas diffusion layers 132a, 132b, respectively. The length of the resinous supports 134a is the same as the width of the gas diffusion layer 132a, and the length of the resinous supports 134b is the same as the width of the gas diffusion layer 132b. The end surfaces of the gas diffusion layers 132a, 132b are aligned with the side surfaces of the gas diffusion layers 132a, 132b. The resinous supports 134a, 134b are embedded in the foamed members by impregnation.

In the fuel cell according to the present invention, the reactant gas flow field is formed in the foamed member. Since the foamed member itself form the reactant gas flow field, it is not necessary to form any grooves in the separator or diffusion member for the reactant gas flow field. Therefore, the overall production cost for the fuel cell is reduced effectively, and the fuel cell is small. In particular, when separators in the form of metal plates are used, since it is not necessary to form grooves by press forming, various types of the reactant gas flow fields can be designed freely without the constraints, and it is possible to produce thin separators. Further, since the separators are in surface to surface contact with the membrane electrode assembly, the electrical resistance in the thickness direction of the separators can be reduced.

Simply by determining the shapes and positions of the resinous flow field walls, various shapes of gas supply passages can be formed easily at arbitrary positions.

The resinous seals are provided in the foamed member to form the reactant gas passages in the resinous seals. Thus, no complicated sealing structure is required, and the structure of the fuel cell is simple. Since the resinous seals are provided in the foamed member to improve the sealing characteristics, the leakage of the reactant gases is reliably prevented.

When a load is applied to the diffusion member in contact with the electrode catalyst layer, the load is reliably supported by the resinous support in the foamed member made of metal material. Thus, the foamed member of the diffusion member is not deformed plastically. Since the foamed member is not deformed undesirably, the resistance overpotential is not increased, and the desired power generation performance is effectively maintained.

Even though foamed members having high porosity are not mechanically strong, it is possible to use such foamed members for the diffusion members. Therefore, the gas diffusion properties are improved greatly. The weight of the entire fuel cell is small. Dedicated structures for protecting the diffusion members are not required. Thus, the overall size and weight of the fuel cell can be reduced easily.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a membrane electrode assembly and separators for sandwiching said membrane electrode assembly, said membrane electrode assembly including a pair of electrodes and an electrolyte membrane interposed between said electrodes, said electrodes each including an electrode catalyst layer in contact with said electrolyte membrane and a diffusion member in contact with said electrode catalyst layer, wherein said diffusion member includes a foamed member made of metal material, and a resinous member in said foamed member, wherein said resinous member comprises resinous supports for supporting a load applied to said fuel cell in a stacking direction of said fuel cell, and wherein a metal stopper is interposed between said resinous supports, and said resinous supports are formed by impregnating said foamed member with resin.

2. A fuel cell according to claim 1, wherein said resinous supports are formed in said foamed member, and spaced by a predetermined distance from a surface of said electrode catalyst layer facing said foamed member.

3. A fuel cell according to claim 1, wherein said resinous supports provided on one side of said electrolyte membrane and said resinous supports provided on the other side of said electrolyte membrane are in alignment with each other in said stacking direction.

4. A fuel cell according to claim 1, wherein a plurality of said fuel cells are stacked to form a fuel cell stack, and said resinous supports in each of said fuel cells are in alignment with each other in said stacking direction.

5. A fuel cell comprising a membrane electrode assembly and separators for sandwiching said membrane electrode assembly, said membrane electrode assembly including a pair of electrodes and an electrolyte membrane interposed between said electrodes, said electrodes each including an electrode catalyst layer in contact with said electrolyte membrane and a diffusion member in contact with said electrode catalyst layer,
- wherein said diffusion member includes a foamed member made of metal material, and a resinous member in said foamed member,
- wherein said resinous member comprises resinous supports for supporting a load applied to said fuel cell in a stacking direction of said fuel cell, and
- wherein said resinous supports are planar plates embedded in said foamed member, and formed by impregnation.

6. A fuel cell according to claim 5, wherein said resinous supports are formed in said foamed member, and spaced by a predetermined distance from a surface of said electrode catalyst layer facing said foamed member.

7. A fuel cell according to claim 5, wherein said resinous supports provided on one side of said electrolyte membrane and said resinous supports provided on the other side of said electrolyte membrane are in alignment with each other in said stacking direction.

8. A fuel cell according to claim 5, wherein a plurality of said fuel cells are stacked to form a fuel cell stack, and said resinous supports in each of said fuel cells are in alignment with each other in said stacking direction.

* * * * *